United States Patent
de Leijer

(10) Patent No.: US 6,236,170 B1
(45) Date of Patent: May 22, 2001

(54) LIGHT EMITTER SYSTEM HAVING A NUMBER OF LIGHT EMITTERS AND HOLDERS FOR THE LIGHT EMITTERS

(75) Inventor: Antonius L. G. M. de Leijer, Vught (NL)

(73) Assignee: Suzo International (NL) B.V., Oud-Beijerland (NL)

( * ) Notice: Subject to any disclaimer, the term of this patent is extended or adjusted under 35 U.S.C. 154(b) by 0 days.

(21) Appl. No.: 09/497,311

(22) Filed: Feb. 3, 2000

Related U.S. Application Data

(63) Continuation of application No. PCT/NL97/00468, filed on Aug. 15, 1997.

(51) Int. Cl.[7] .................................................. H05B 37/00
(52) U.S. Cl. ........................ 315/316; 315/324; 315/312
(58) Field of Search .................................. 315/316, 312, 315/324, 294, 291, 292, 293, 317, 318, 319, 295

(56) References Cited

U.S. PATENT DOCUMENTS

| | | | |
|---|---|---|---|
| 4,095,139 | * 6/1978 | Symonds et al. ..................... | 315/153 |
| 4,418,333 | 11/1983 | Schwarzbach et al. .............. | 340/310 |
| 5,254,908 | 10/1993 | Alt et al. ............................... | 315/312 |
| 5,323,088 | * 6/1994 | Cunningham ........................ | 315/195 |
| 5,352,957 | 10/1994 | Werner ................................. | 315/291 |
| 5,544,037 | 8/1996 | Luger ................................... | 364/146 |
| 5,821,700 | * 10/1998 | Malvaso ............................... | 315/291 |
| 5,866,992 | * 2/1999 | Geiginger et al. ................... | 315/294 |
| 5,866,994 | * 2/1999 | Nakano ................................. | 315/362 |

FOREIGN PATENT DOCUMENTS 44 22 215 1/1996 (DE).

* cited by examiner

Primary Examiner—Don Wong
Assistant Examiner—Tuyet T. Vo
(74) Attorney, Agent, or Firm—Stroock & Stroock & Lavan LLP

(57) ABSTRACT

Display system comprising a number of lamp holders which each have a local control unit and which are suitable for holding and connecting to the local control unit a lamp, the local control units of the various lamp holders being connected to a common conductor bundle to which a central control unit and a supply unit are also connected. Each local control unit contains an address. If a local control unit receives a message containing the address of the local control unit from the conductor bundle it responds, depending on any other content of the message, for optionally activating the associated lamp, for optionally changing the address and for sending back a message which specifies the conducting state between connections for the lamp.

5 Claims, 2 Drawing Sheets

LIGHT EMITTER SYSTEM HAVING A NUMBER OF LIGHT EMITTERS AND HOLDERS FOR THE LIGHT EMITTERS

CROSS-REFERENCE TO RELATED APPLICATIONS

This is a continuation application of PCT/NL97/00468 filed Aug. 15, 1997.

FIELD OF THE INVENTION

The invention relates to a light emitter system comprising a number of light emitters and a central control unit, in which each light emitter is mounted in a holder and each light emitter is connected to the central control unit via connections of the holder and conductors in order to be selectively activated by the central control unit, each holder has a local control unit which is connected to the light emitter of the holder and, via the conductors, to the central control unit, the local control unit has a writable memory in which during manufacturing an original address and during installation an operational address allocated to the local control unit are stored, the local control unit is suitable for recognizing the presence of the light emitter, and the central control unit accesses the local control unit by transmitting a message containing the address for optionally activating the light emitter depending on any other content of the message, for optionally changing the address in the memory and for sending back to the central control unit a message about a locally detected information which is significant to the central control unit.

The invention also relates to a holder for a light emitter, comprising holding means, two first electrical contacts and electrical supply terminals connected to the first contacts, the holding means being suitable for holding the light emitter in such a way that the first contacts are in contact with corresponding second contacts of the light emitter, a control unit which is connected to the first contacts and terminals the control unit having a writable memory in which an original address, determined when manufacturing a local control unit, and an operational address, allocated to the local control unit during installation, are stored, the control unit is suitable for recognizing the presence of the light emitter, and the central control unit accesses the local control unit by transmitting a message containing the address for optionally activating the light emitter, the control unit being suitable for receiving a message from the outside and, on receiving a message containing the address of the control unit, the control unit takes action, depending on any other content of the message, for optionally activating the light emitter, for optionally changing the address and for sending back a message about a locally detected information which is significant to a sender of the received message.

BACKGROUND OF THE INVENTION

A system and a holder, in particular a lighting device, of the above type are disclosed by U.S.-A-5352957.

The prior art system comprises a number of appliances, such as motors and lighting devices of several types, e.g. gas discharge lamp, halogen radiator, arc lamp or normal incandescent lamp. Each appliance has associated therewith an individual local control unit comprising a bus controller, a memory and a control switch connected to a 220 V mains supply and through a bus to a central command generator, called central control unit hereinafter.

Before its physical installation the appliances to be mounted therein each contain an original address formed by a production number which is specific for a receiver of the appliance. Therefore, originally all local control units have different original addresses. After physical installation of the system it is tested. Subsequently the central control unit transmits a single command to all local control units to poll their original addresses. When receiving a proper original address in return an operational address is selected based on a predetermined plan and the central control unit will transmit a message containing a command for the local control unit with said original address to store the selected operational address in the memory of the local control unit. A local control unit continues to transmit its original address until it receives a specific message from the central control unit in return. Following the transmission of the polling command by the central control unit of the prior art system it is likely that collision of returned messages from different local control units occur. This might even lead to endlessly repeating transmission of such return messages by local control units. In that case the step of allocating operational addresses to the appliances of the system may not come to an end, by which the system cannot be brought into operation.

With the prior art system it is necessary to make a note of the different original addresses of the mounted appliances associated with their specific locations in order to be able to use said predetermined plan to allocate specific operational addresses to specific ones of the appliances, so that they can be controlled each individually on demand during proper operation of the system.

Therefore the steps of the physical installation of the system, making notes of the original addresses of its appliances inclusive, and allocating operational addresses to the appliances with the prior art system are time consuming and therefore expensive.

The invention relates, in particular, to a display system for use in appliances having a large number of light emitters, such as gambling machines and illuminated news trailers.

A display system of the above mentioned type is known in practice for use in gambling machines in which the light emitters are incandescent lamps.

According to a first known possibility for the connection of the light emitters to the central control unit, first connections of the light emitters are connected to a common supply conductor and second connections of the light emitters are connected to another supply conductor via an individual switching means. Although the central control unit is simple in this case, the large number of connecting points, the extensive wiring and the difficulty in being able to change the wiring are great drawbacks.

According to another known possibility for connecting light emitters to the central control unit, each light emitter is connected in series with a diode and each series connection of a light emitter and a diode is connected in the same polarization direction between a row and a column of a matrix and the rows and columns are connected to two supply conductors via individual switching means. Although the number of connecting points is in this case limited, the selective control of the rows and columns makes the central control unit complicated. Furthermore, in the case of use in gambling machines and illuminated news trailers, for example, extensive wiring is nevertheless necessary and this, like the matrix, is difficult to change. Another drawback is that the light emitters can be activated simultaneously only in a limited number of combinations without other light emitters also being unintentionally activated. As a result, in designing the system, account has to be taken of the light output of the various light emitters or groups of light emitters and of the individual activation or time-dependent activation per group of the light emitters. This makes the design troublesome and expensive and presents a drawback to changing the design.

In display systems of the above mentioned type, it is known to make use of a holders for light emitters which have blade contacts into which conductors for connection to the central control unit can be pressed, as a result of which the necessary electrical contacts can be effected without other means and operations. The above mentioned drawbacks, however, continue to apply.

SUMMARY OF THE INVENTION

The object of the invention is to eliminate the above mentioned drawbacks.

Therefore, according to the invention, there is provided a light emitter system comprising a number of light emitters and a central control unit, in which each light emitter is mounted in a holder and each light emitter is connected to the central control unit via connections of the holder and conductors in order to be selectively activated by the central control unit, each holder has a local control unit which is connected to the light emitter of the holder and, via the conductors, to the central control unit, the local control unit has a writable memory in which during manufacturing an original address and during installation an operational address allocated to the local control unit are stored, the local control unit is suitable for recognizing the presence of the light emitter, and the central control unit accesses the local control unit by transmitting a message containing the address for optionally activating the light emitter depending on any other content of the message, for optionally changing the address in the memory and for sending back to the central control unit a message about a locally detected information which is significant to the central control unit, wherein the local control unit does not send back a message if both its address is an original address and the significant information corresponds to a conducting state between the connections for the light emitter as in a case of an absence of a proper light emitter between said connections, while a local control unit returns a message when receiving a message containing an address which it has to respond to.

In addition, according to the invention, there is provided a holder for a light emitter, comprising holding means, two first electrical contacts and electrical supply terminals connected to the first contacts, the holding means being suitable for holding the light emitter in such a way that the first contacts are in contact with corresponding second contacts of the light emitter, a control unit which is connected to the first contacts and terminals the control unit having a writable memory in which an original address, determined when manufacturing a local control unit, and an operational address, allocated to the local control unit during installation, are stored, the control unit is suitable for recognizing the presence of the light emitter, and the central control unit accesses the local control unit by transmitting a message containing the address for optionally activating the light emitter, the control unit being suitable for receiving a message from the outside and, on receiving a message containing the address of the control unit, the control unit takes action, depending on any other content of the message, for optionally activating the light emitter, for optionally changing the address and for sending back a message about a locally detected information which is significant to a sender of the received message, wherein the control unit does not send back a message if both its address is an original address and the significant information corresponds to a conducting state between the connections for the light emitter as in a case of an absence of a proper light emitter between said connections while a local control unit returns a message when receiving a message containing an address which it has to respond to.

Allocating operational addresses can take place fast by inserting light emitters in a specific order into the holders of the system. As an alternative the light emitters can be placed in their holders without taking care of any particular order but before making a supply wiring to the local control units, and to subsequently make the wiring in a specific order of the local control units. In addition the central control unit can easily monitor the condition of the light emitters by monitoring the return or not of a message in response to a message transmitted by the central control unit for a particular light emitter holder.

Holders which are in a store can have the same initial address and can be individualized by a separate address after installation in a display system. This simplifies the logistics and the costs thereof.

BRIEF DESCRIPTION OF THE DRAWINGS

Other advantages and properties of the invention will emerge from the explanation given below with reference to the accompanying drawings, in which.

DESCRIPTION OF THE PREFERRED EMBODIMENT

Figure 1:
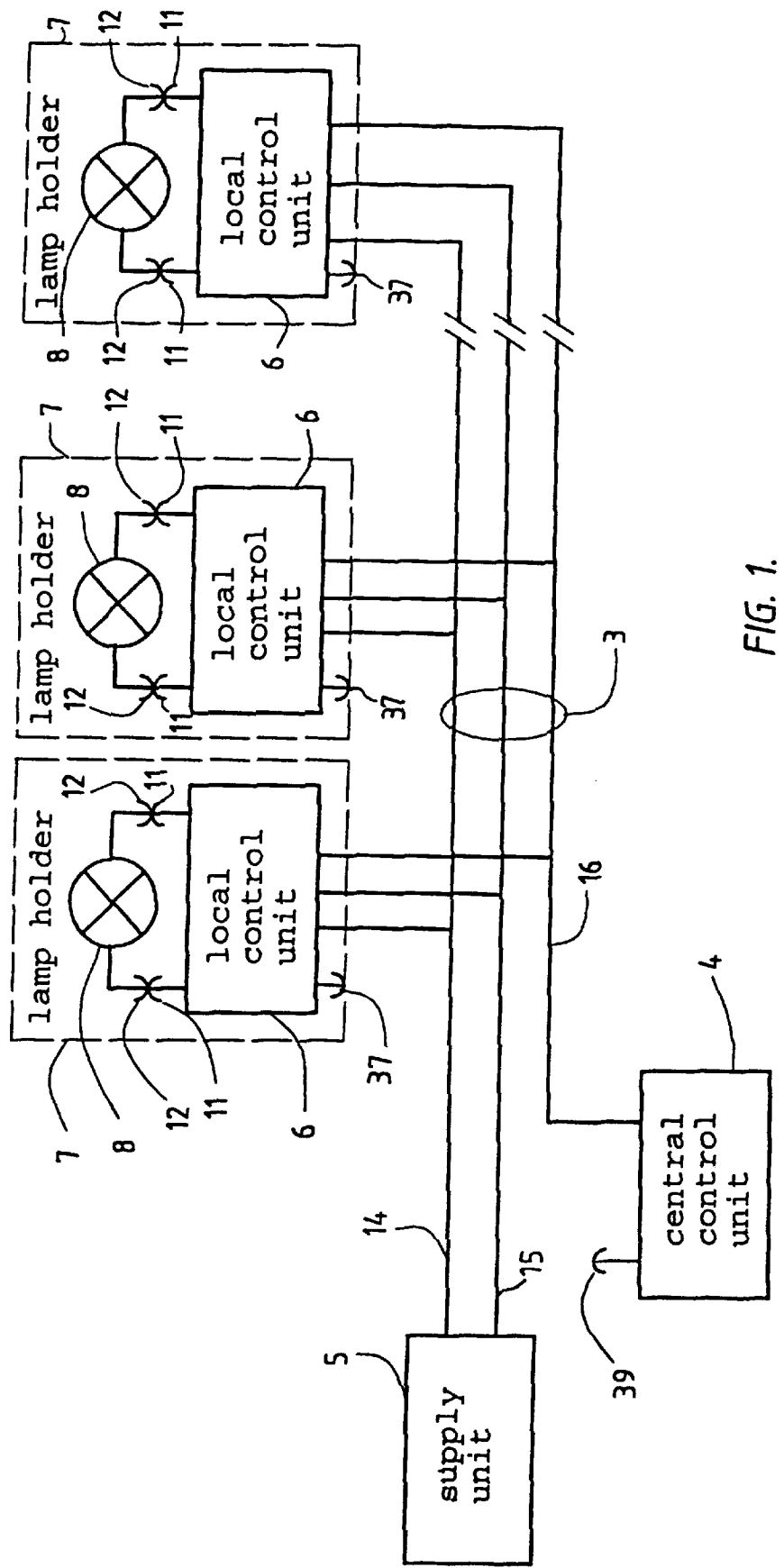
FIG. 1 shows an electrical diagram of a display system according to the invention.

The display system according to the invention shown in FIG. 1 comprises a bundle of conductors 3 and, connected to the conductor bundle 3, a central control unit 4, a supply unit 5 and a number of local control units 6. Each local control unit 6 is mounted in a lamp holder 7, in which a lamp 8 is also mounted and which can be connected to the local control unit 6. The lamp holder 7 and the lamp 8 are suitable, in particular, for plugging the lamp 8 removably into the holder 7, a connection taking place between the local control unit 6 and the lamp 8 via contacts 11 of the local control unit 6 and contacts 12 of the lamp 8.

The conductor bundle 3 comprises a first supply conductor 14, a second supply conductor 15 for a lower supply voltage and a transmission conductor 16 for the transmission of messages between the central control unit 4 and the local control units 6. The conductors 14, 15, 16 of the bundle 3 are connected, respectively, to terminals 17, 18, 19 (FIG. 2) of each local control unit 6. The terminals 17, 18, 19 are, in particular, knife contacts known per se into which the conductors 14, 15, 16 can easily be pressed to make an electrical connection to the local control unit 6. As a result of this, the conductor bundle 3 can easily and rapidly be mounted between all the control units 4, 6 and electrically connected thereto.

Figure 2:
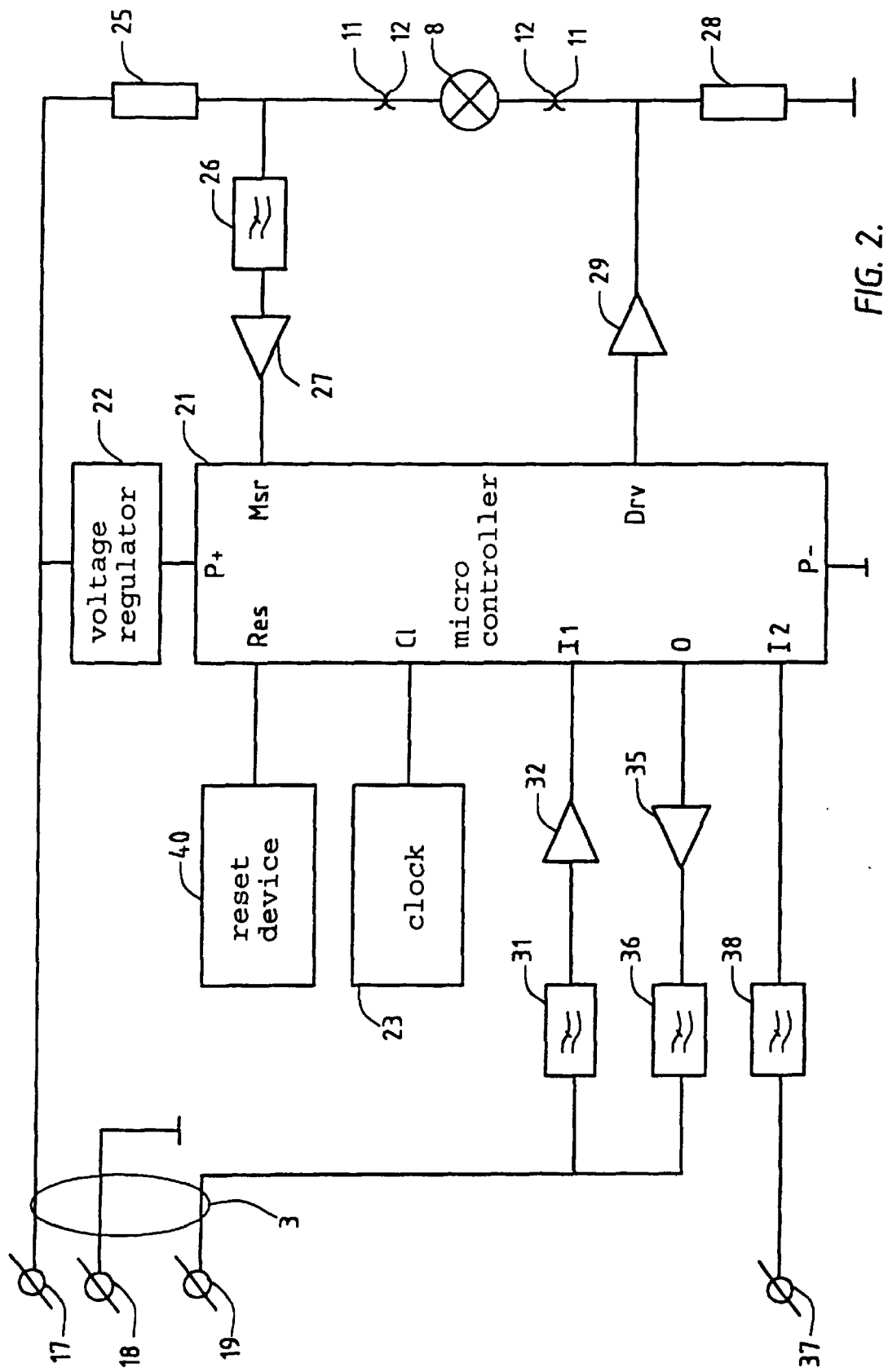
FIG. 2 shows an electrical diagram of a holder according to the invention.

As shown in FIG. 2, the local control unit 6 has a microcontroller 21 having supply terminals P+ and P− which are connected to the supply terminals 17, 18 via a voltage regulator 22. A clock 23 is connected to a clock input Cl of the microcontroller 21. One of the contacts 11 of the holder 7 is connected via a measuring resistor 25 to the first supply connection 17 and via a series connection of a low-pass filter 26 and an amplifier 27 to a measurement input Msr of the microcontroller 21. The other contact 11 of the holder 7 is connected via a short-circuit current-limiting resistor 28 to the second supply terminal 18 and via a drive circuit ("driver") to a terminal Drv of the microcontroller 21.

The message-transmission terminal 19 is connected via a series circuit of a low-pass filter 31 and an amplifier 32 to a serial data input I1 of the microcontroller 21. A serial data output O of the microcontroller 21 is connected via a series circuit of an amplifier 35 and a low-pass filter 36 to the connection 19.

A contact 37 which can be electrically contacted from outside the lamp holder 7 is connected via a low-pass filter 38 to a second serial data input I2 of the microcontroller 21.

The microcontroller 21 has a memory (not shown) in which an address assigned to the local control unit 6 is stored.

If the central control unit 4 transmits, via the conductor bundle 3, a message containing the address of the local control unit 6, the local control unit 6 responds thereto in accordance with any command and further data in the message received but does not otherwise respond.

If the message which is received by the local control unit 6 and to which it responds contains an "activation" command, the driver circuit 29 is controlled by the microcontroller 21 so as to transmit a current from the first supply terminal 17 and via the resistor 25, a lamp 8, which is present, and the circuit 29 so that the lamp 8 will light up. As a result of this, a voltage drop is produced across the resistor 25 so that a voltage at the measurement input Msr of the microcontroller 21 is lower than if the lamp 8 were not present or if the circuit 29 was not set to transmit a current. If the voltage measured is high while the circuit 29 is transmissive, this means that the lamp 8 is not present or is defective.

On the other hand, if there is a short circuit between the contacts 11, in particular if the lamp 8 is defective and it forms a short circuit, the measured voltage at the measurement input Msr of the microcontroller 21 deviates from reference voltages for a correctly operating lamp 8 which optionally conducts a current via the circuit 29.

If the local control unit 6 has received, via the input I1 of the microcontroller 21, a message which contains the address of the local control unit 6, it performs any command present in the message and sends back a message from the output O of the microcontroller 21, the message sent back containing the status or conduction state of the lamp 8 or, more generally, between the contacts 11 of the lamp holder 7.

Depending on the status of a lamp holder 7 present in a message received by the central control unit 4, the central control unit 4 records said status and, if necessary, generates an alarm message. If the address of the last message transmitted by the central control unit 4 was an initial address and if the central control unit 4 receives back a message in response thereto, the central control unit 4 transmits a new message which contains a new address and a command which is used by the local control unit 6 having the initial address in order to change the initial address into the new address.

The local control unit 6 can be organized permanently or depending on a command received from the central control unit 4 so that, if no current flows between the contacts 11 while the circuit 29 has in fact been rendered transmissive, the local control unit 6 does not send back a message, at least not if the address thereof is the initial address. In conjunction with the manner in which the central control unit 4 responds to a message which is received back in response to a message having an initial address transmitted by the central control unit 4, the display system according to the invention can be particularly easily programmed as a result.

That is to say, if all the lamp holders 7 of the display system have been installed, the conductor bundle 3 has been mounted between the supply unit 5 and the control units 4, 6, the addresses of the local control units 6 are the initial address, and no lamps 8 are present in the lamp holders 7, the central control unit 4 can program individual addresses in the various local control units 6 by repeatedly emitting a message containing the initial address and by transmitting a subsequent message containing a new address and an address change command after receiving back a message, that is to say if a lamp holder 7 containing a fitted, correctly operating lamp 8 has responded. The local control units 6 of all the lamp holders 7 can then be consecutively programmed with new addresses or individualized by consecutively fitting lamps 8.

Even if the display system is in operation, the central control unit 4 can proceed with the periodical transmission between other messages of a message which contains an initial address. As a result of this, it is possible to replace a lamp holder 7 and to replace the initial address of its local control unit 6 by a new address. Similarly, it is possible to mount additional lamp holders 7.

A similar type of message exchange can take place between the central control unit 4 and the local control units 6 if all the lamps 8 have been initially fitted, the addresses of the various local control units 6 are the initial address, and the message transmission conductor 16 is consecutively connected to the local control units 6 of the various lamp holders 7.

In the two programming examples explained above, the local control units 6 of the various lamp holders 7 can be rapidly and easily programmed, it only being necessary to be mindful of a certain sequence of fitting lamps 8 or a sequence of connecting the various local control units 6 to the message transmission conductor 16.

As an alternative, to program a local control unit 6 of a replaced or added lamp holder 7, a temporary connection can be made between the contact 37 of the local control unit 6 to be programmed and a contact 39 of the central control unit 4 for the purpose of supplying a programming command and a new address for the local control unit 6 to the serial data input I2 of the microcontroller 21 of the local control unit 6 via said temporary connection.

A reset device 40, which is, in particular, a switch, is connected to a reset input Res of the microcontroller 21 to enable the microcontroller 21 to be reset to the initial state.

Although the invention has been explained for an embodiment having a conductor bundle which comprises three conductors, various alternatives are possible within the scope of the invention. The message exchange can take place, for example, via a separate conductor pair or by modulation of a high-frequency alternating voltage and superimposed on the supply voltage over the conductor pair 14, 15.

Furthermore, the lamps 8 can also be replaced, within the scope of the invention, by other types of light emitters, such as light-emitting diodes.

What is claimed is:

1. Light emitter system comprising a plurality of light emitters and a central control unit, each of the light emitters being mounted in a holder and each of the light emitters being connected to the central control unit via connections of the holders and conductors such that the light emitters are selectively activated by the central control unit, each said holder having a local control unit which is connected to the light emitter of the associated holder and, via the conductors, to the central control unit, the local control unit having a writable memory in which during manufacturing an original address is stored and in which during installation an operational address allocated to the associated local control unit is stored, the local control unit being suitable for recognizing the presence of a properly operating light emitter, wherein the central control unit accesses the local control unit by transmitting messages so as to optionally activate the associated light emitter, and to optionally change the original address to the operational address, the local control unit being configured to send to the central control unit a message containing locally detected information and wherein in response to a message transmitted from the central control unit, the local control unit does not send a message to the central control unit if both original address is stored in the associated memory, and the locally detected information corresponds to a state indicating an absence of a properly operating light emitter in the associated holder.

2. System according to claim 1, wherein the original addresses of a plurality of the local control units are identical, and wherein during installation, the central control unit repeatedly emits a message containing the identical original address and, on receiving a message sent by one of the local control units, the central control unit emits a subsequent message containing the identical original address, the operational address and a command for changing the identical original address into the operational address.

3. System according to claim 1, wherein the local control unit has an externally contactable programming contact for changing the original address of the local control unit via a temporary conductor between the central control unit and the programming contact.

4. Holder for a light emitter, comprising holding means, two first electrical contacts, electrical supply terminals being connected to the first contacts, the holding means being suitable for holding the light emitter in such a way that the first contacts are in contact with the light emitter, and a control unit which is connected to the first contacts, the control unit having a writable memory in which an original address, determined when manufacturing control unit, and an operational address, allocated to the control unit during installation, are stored, the control unit being suitable for recognizing the presence of a properly operating light emitter, wherein the control unit being suitable for receiving a message, and on receiving the control unit being suitable for optionally activating the light emitter, for optionally changing the original address to the operational address and for optionally sending a message containing locally detected information, wherein the control unit does not send a message if both the original address is stored in the memory and the locally detected information corresponds to a state indicating an absence of a properly operating light emitter.

5. Holder according to claim 4, wherein the control unit has an externally contactable programming contact for changing the original address of the control unit via a temporary conductor between the central control unit and the programming contact.

\* \* \* \* \*